US009062706B2

(12) United States Patent
Hirokawa et al.

(10) Patent No.: US 9,062,706 B2
(45) Date of Patent: Jun. 23, 2015

(54) MECHANISM FOR OPERATING VEHICLE SPLIT SEAT (75) Inventors: Masato Hirokawa, Hiroshima (JP); Satoshi Fujita, Hiroshima (JP); Keisuke Iida, Hiroshima (JP); Saori Mito, Hiroshima (JP); Nanae Michida, Aki-gun (JP); Yuina Ashihara, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 153 days.

(21) Appl. No.: 13/825,529

(22) PCT Filed: Nov. 22, 2011

(86) PCT No.: PCT/JP2011/006494
§ 371 (c)(1),
(2), (4) Date: Mar. 21, 2013

(87) PCT Pub. No.: WO2012/073453
PCT Pub. Date: Jun. 7, 2012

(65) Prior Publication Data
US 2013/0200678 A1 Aug. 8, 2013

(30) Foreign Application Priority Data

Nov. 29, 2010 (JP) ................................. 2010-264495

(51) Int. Cl.
F16C 1/10 (2006.01)
B60N 2/02 (2006.01)
(Continued)

(52) U.S. Cl.
CPC ........... *F16C 1/106* (2013.01); *Y10T 74/20438* (2015.01); *B60N 2/0296* (2013.01); *B60N 2/366* (2013.01); *B60N 2205/40* (2013.01); *B60N 2205/35* (2013.01); *B60N 2/20* (2013.01)

(58) Field of Classification Search
CPC .. B60N 2/366; B60N 2/2245; B60N 2205/40; E05B 85/16; E05B 85/12

USPC .......... 297/354.1, 378.12, 378.13; 296/65.16, 296/65.17; 292/336.3, DIG. 31
See application file for complete search history.

(56) References Cited

U.S. PATENT DOCUMENTS

D303,620 S * 9/1989 Russell et al. ................. D8/313
D303,621 S * 9/1989 Russell et al. ................. D8/313
(Continued)

FOREIGN PATENT DOCUMENTS

JP 10-086717 A 4/1998
JP 2003-118456 A 4/2003
(Continued)

OTHER PUBLICATIONS

International Search Report; PCT/JP2011/006494; Dec. 27, 2011.

*Primary Examiner* — Sarah B McPartlin
(74) *Attorney, Agent, or Firm* — Studebaker & Brackett PC (57) ABSTRACT The present invention provides a mechanism for operating a vehicle split seat whereby operation levers of two seat backs can be arranged compactly on a wall surface of a luggage compartment or the like such that the two operation levers have the same pivot support point, without impairing operability of the levers.

Two operation levers 31, 32 are respectively connected to locking mechanisms of at least two adjacent seat backs 11B by way of operation cables 22, 23, the operation levers 31, 32 being formed of a central lever 32 and an outer lever 31 provided outside the central lever having the same pivot support point, operation parts being provided on the free end sides of arm parts of both the levers 31, 32 and operating spaces X, Y, Z which allow both the levers 31, 32 to be operated individually also being provided.

16 Claims, 6 Drawing Sheets (51) Int. Cl.
  *B60N 2/36* (2006.01)
  *B60N 2/20* (2006.01)

(56) References Cited

U.S. PATENT DOCUMENTS

5,046,340 A * 9/1991 Weinerman et al. ............ 70/208
5,117,665 A * 6/1992 Swan et al. ..................... 70/264
6,145,352 A * 11/2000 Vickers et al. ................. 70/208
7,798,540 B1 * 9/2010 Vitry et al. .................... 292/216
8,267,458 B2 * 9/2012 Lindsay ....................... 296/65.16
8,424,971 B2 * 4/2013 Hentges et al. ........... 297/378.12
2013/0088022 A1 * 4/2013 Collado et al. ............. 292/336.3

FOREIGN PATENT DOCUMENTS

| JP | 2006-341680 A | 12/2006 |
| JP | 2006-347304 A | 12/2006 |
| JP | 2007-216708 A | 8/2007 |

* cited by examiner

MECHANISM FOR OPERATING VEHICLE SPLIT SEAT

TECHNICAL FIELD

The present invention relates to a mechanism for operating a vehicle split seat which is composed in such a manner that a plurality of seat backs split in a width direction of a vehicle are forwardly tiltable by operation of a plurality of operation levers which are arranged on a vehicle body side of a luggage compartment.

BACKGROUND ART

Conventionally, rear seats have a 6:4 split structure in which seat backs are split in a 6:4 ratio between a left side and a right side in the vehicle width direction, or a 4:2:4 split structure in which seat backs are split in a 4:2:4 ratio between a left side, a center and a right side in the vehicle width direction.

In the 6:4 split structure described above, an operation lever which performs a forward tilting operation of the left-side seat back is arranged on the left side of the luggage compartment walls, and an operation lever which performs a forward tilting operation of the right-side seat back is arranged on the right side of the luggage compartment walls, and there is no particular problem with this arrangement, but in the 4:2:4 split structure described above, a total of three operation levers are required, namely, an operation lever for performing a forward tilting operation of the left-side seat back, an operation lever for performing a forward tilting operation of the center seat back, and an operation lever for performing a forward tilting operation of the right-side seat back.

In this case, the operation lever for forwardly tilting the left seat back and the operation lever for forwardly tilting the right seat back may be provided respectively on the left and right side walls of the luggage compartment, but there is a problem of the installation position of the operation lever for forwardly tilting the center seat back, and supposing that the operation lever for forwardly tilting the center seat back is arranged in a vertical alignment with respect to either one of the operation levers for forwardly tilting the left and right seat backs, then there is a problem in that a compact arrangement of the total of three operation levers is difficult to achieve and the external appearance becomes worse, which is undesirable in design terms.

Therefore, Patent Document 1 discloses a rear seat having a 6:4 split structure in which a left-side seat back and a right-side seat back of a rear seat are split in a 6:4 ratio in the vehicle width direction, in which operation parts (corresponding to operation levers) for performing a forward tilting operation of the left and right seat backs are provided respectively on the left and right side faces of the luggage compartment, the left and right operation parts and a locking part on the seat back side being connected by a cable.

The conventional structure disclosed in Patent Document 1 is a structure in which the split seat backs are tilted forwards respectively and independently by individually disposed operation parts, and Patent Document 1 makes no disclosure or suggestion of any kind in respect of the technical idea of the present invention, namely, the compact arrangement of two operation levers.

Patent Document 1: Japanese Patent Application Publication No. 2003-118456

SUMMARY OF THE INVENTION

Therefore, it is an object of the present invention to provide a mechanism for operating a vehicle split seat whereby operation levers of two seat backs can be arranged compactly on a wall surface of a luggage compartment or the like such that the two operation levers have the same pivot support point, without impairing operability of the levers, by respectively connecting the two operation levers to locking mechanisms of at least two adjacent seat backs by way of operation cables, the operation levers being formed of a central lever and an outer lever provided outside the central lever having the same pivot support point, operation parts being provided on the free end sides of arm parts of both the levers and an operating space which allows both the levers to be operated individually also being provided.

The mechanism for operating a vehicle split seat according to the present invention is a mechanism for operating a vehicle split seat whereby a plurality of seat backs split in a vehicle width direction with respect to a vehicle body can be tilted forwards by operation of a plurality of operation levers which are arranged on a vehicle body side of a luggage compartment located on the vehicle rear side of the seat backs; wherein two operation levers are respectively connected via operation cables to locking mechanisms of at least two adjacent seat backs; the operation levers are formed of a central lever and an outer lever provided on the outside of the central lever, the central lever and the outer lever having a same pivot support point; both the levers each have an arm part which can swing about the pivot support point and an operation part provided on a free end side of the arm part; and an operation space for individually operating both the levers is formed between both the levers.

There may be one or more of the operation spaces described above.

According to the composition described above, since the central lever and the outer lever have the same pivot support point, operation parts are provided on the free end sides of the arm parts of the levers and an operation space which enables individual operation of both the levers is provided, then the operation levers of the two seat backs can be arranged compactly on a wall surface of the luggage compartment or the like such that the two operation levers have the same pivot support point, without impairing operability of the levers, due to the formation of the operation parts and the operation space.

According to the present invention, a beneficial effect is obtained in that operation levers of two seat backs can be arranged compactly on a wall surface of a luggage compartment or the like such that the two operation levers have the same pivot support point, without impairing operability of the levers, by respectively connecting the two operation levers to locking mechanisms of at least two adjacent seat backs by way of operation cables, the operation levers being formed of a central lever and an outer lever provided outside the central lever having the same pivot support point, operation parts being provided on the free end sides of arm parts of both the levers and an operating space which allows both the levers to be respectively operated also being provided.

BEST MODE FOR CARRYING OUT THE INVENTION

One embodiment of the present invention is described in detail below with reference to the drawings.

Figure 1:
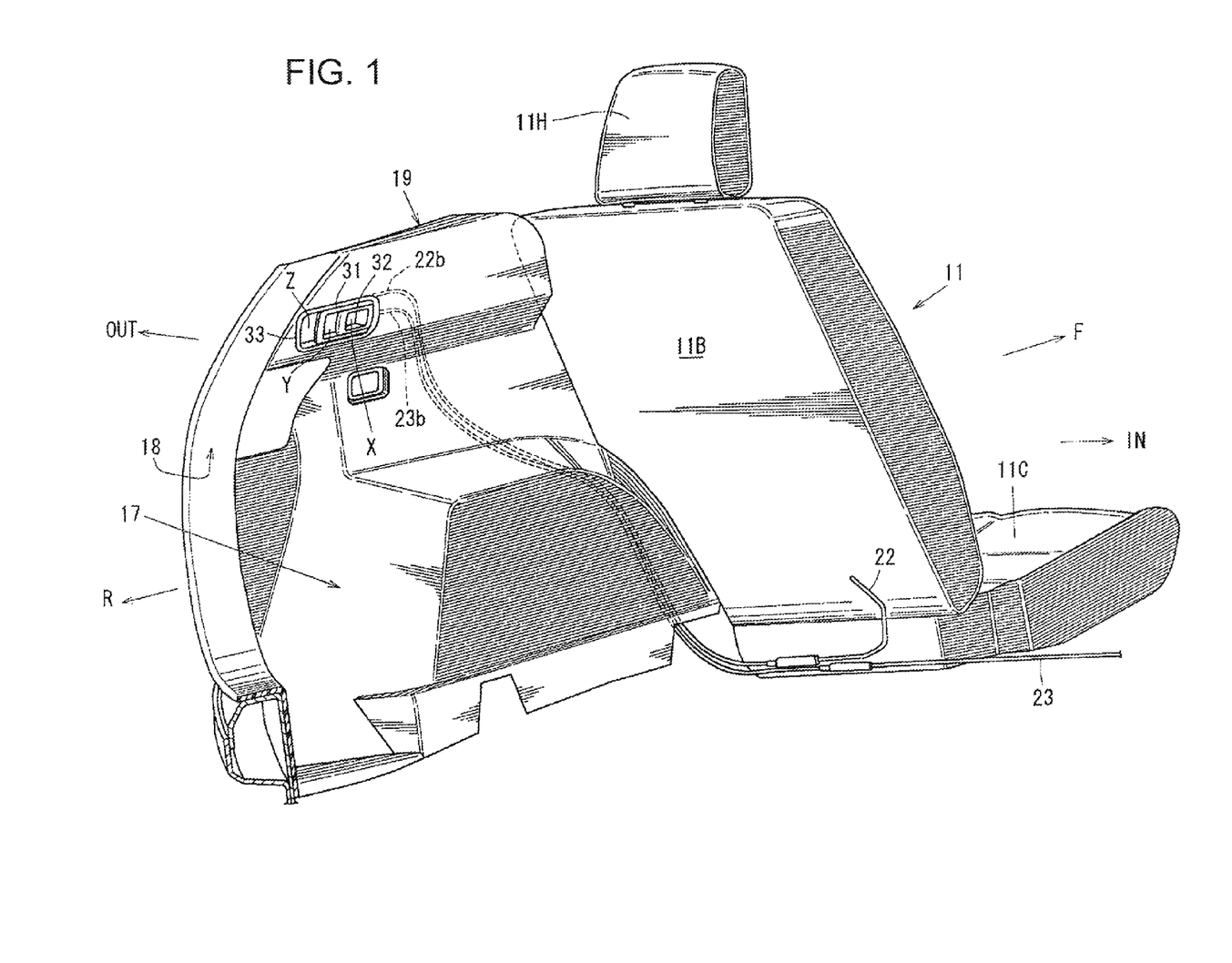
FIG. 1 is a perspective diagram showing a mechanism for operating a vehicle split seat according to the present invention.
Figure 2:
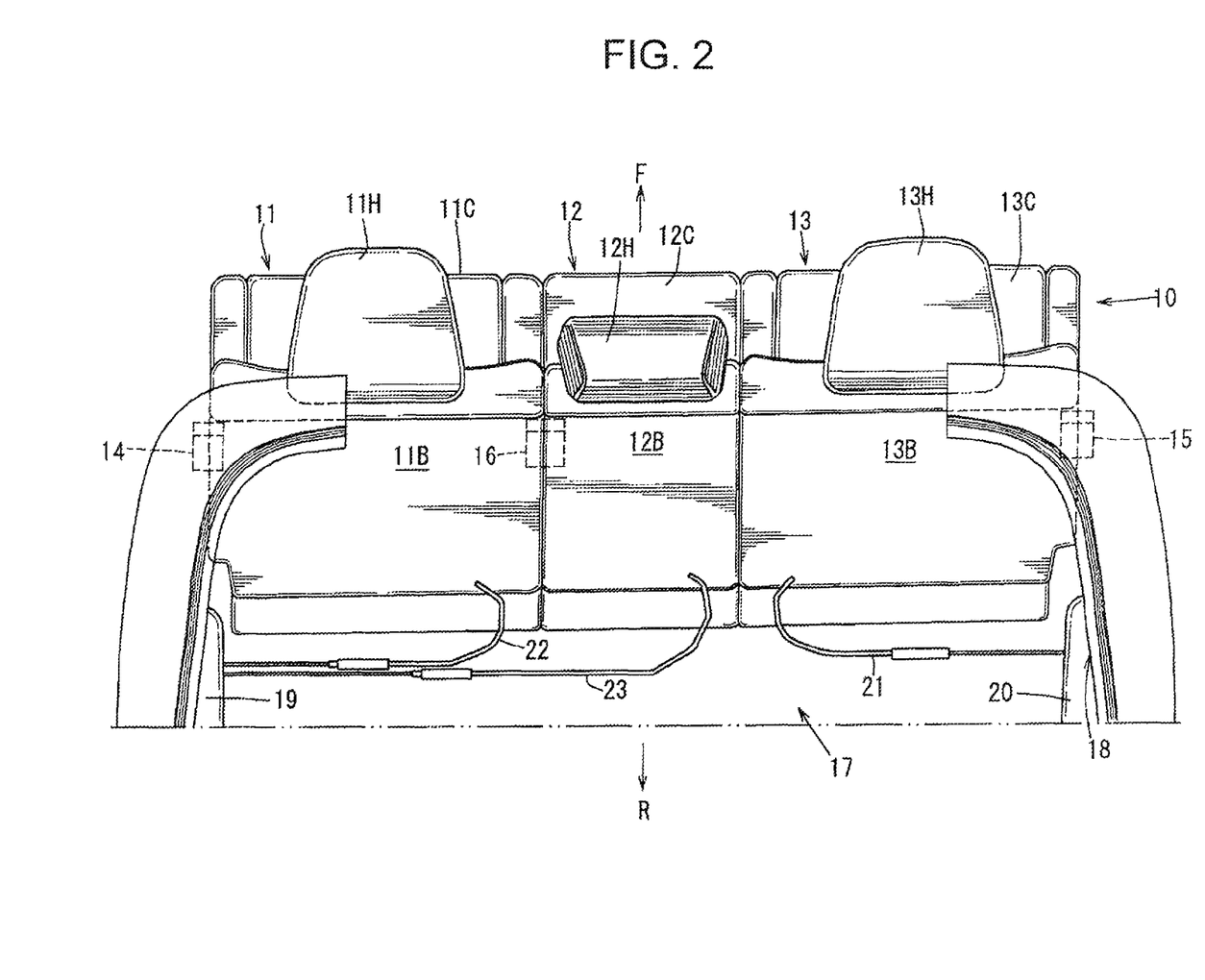
FIG. 2 is a rear face diagram showing an arrangement structure of locking mechanisms as viewed from above and to the rear of the vehicle.

The drawings show a mechanism for operating a vehicle split seat, FIG. 1 is a perspective diagram showing the operating mechanism, and FIG. 2 is a rear face diagram showing a split seat structure and a locking mechanism arrangement structure as viewed from above and to the rear of the vehicle.

Firstly, to describe the split structure of the rear seat with reference to FIG. 2, the rear seat 10 includes a left-side seat 11 which is positioned on the left side in the vehicle width direction, a center seat 12 which is positioned in the center of the vehicle width direction, and a right-side seat 13 which is positioned on the right side in the vehicle width direction, these seats 11, 12, 13 being split in such a manner the length thereof in the vehicle width direction assumes a ratio of 4:2:4, thereby achieving a 4:2:4 split structure.

The left-side seat 11 which is an outer seat positioned on an outer side of the vehicle width direction includes a seat cushion 11C which forms a seating surface for the occupant, a seat back 11B which forms a back supporting surface for the occupant, and a head rest 11H which holds the occupant's head. The seat back 11B is composed so as to be forwardly tiltable onto the seat cushion 11C.

The central seat 12 which is an inner seat that is positioned to the inner side of the vehicle width direction and has a narrower width in the vehicle width direction than the outer seat has a seat cushion 12C which forms a seating surface for the occupant, a seat back 12B which forms a back supporting surface for the occupant, and a head rest 12H which holds the occupant's head. The seat back 12B is composed so as to be forwardly tiltable onto the seat cushion 12C, either independently or together with the seat back 11B of the left-side seat 11.

Similarly, the right-side seat 13 which is an outer seat positioned on an outer side of the vehicle width direction includes a seat cushion 13C which forms a seating surface for the occupant, a seat back 13B which forms a back supporting surface for the occupant, and a head rest 13H which holds the occupant's head. The seat back 13B is composed so as to be forwardly tiltable onto the seat cushion 13C.

Due to the 4:2:4 split structure of the rear seat 10 described above, the seat backs 11B, 12B, 13B are split into plurality (three) in the vehicle width direction. The seat cushions 11C, 12C, 13C may have a split structure or may have a bench type unsplit structure.

Next, the composition of the locking mechanism will be described with reference to FIG. 2.

A locking mechanism 14 constituted by a latch and a striker is provided between the left-side vehicle body and the left side section of the seat back 11B in such a manner that the seat back 11B of the left-side seat 11 which is an outer seat back is held in an upright locked state with respect to the vehicle body.

The "latch" referred to here means an engaging part which can be switched, for example, between states of projecting and not projecting beyond the end part of the seat back in the side surface direction. Moreover, the "striker" referred to here means an engaged part which receives the latch (engaging part) when the latch is in a state of projected beyond the end part. In other words, a state where the latch (engaging part) is engaged with the striker (engaged part) is called a locked state and a state where the latch and striker are not engaged is called an unlocked state (free state).

In this case, the latch, of the latch and striker of the locking mechanism 14, is provided on the seat back 11B, and the striker is provided on the vehicle body side.

Similarly, a locking mechanism 15 constituted by a latch and a striker is provided between the right-side vehicle body and the right side section of the seat back 13B in such a manner that the seat back 13B of the right-side seat 13, which is an outer seat back, is held in an upright locked state with respect to the vehicle body.

In this case, the latch, of the latch and striker of the locking mechanism 15, is provided on the seat back 13B, and the striker is provided on the vehicle body side.

Moreover, a locking mechanism 16 constituted by a latch and a striker is provided between the seat backs 11B, 12B, in such a manner the seat back 12B of the central seat 12, which is an inner seat back, is held in an upright locked state with respect to the seat back 11B of the left-side seat 11.

In this case, the latch, of the latch and striker of the locking mechanism 16, is provided on the left side section of the seat back 12B, and the striker is provided on the right side section of the seat back 11B.

As shown in FIG. 1 and FIG. 2, a composition is adopted in which a luggage compartment 17 is formed to the rear of the rear seat 10 described above, and by providing a lift gate (not illustrated) which opens and closes a rear opening section 18 of the luggage compartment 17 and by lifting up the lift gate so as to open this rear opening section 18, the luggage compartment 17 can be accessed in order to put in and take out luggage to and from the luggage compartment 17 via the rear of the vehicle.

Furthermore, rear side trims 19, 20, which are luggage compartment trims, are arranged on both the left and right-hand sides of the luggage compartment 17 described above, and the left and right rear vehicle side surfaces, such as the rear side panels and the rear wheel housings, and the like, are covered from the side of the luggage compartment 17 by these left and right rear side trims 19, 20.

On the other hand, an operation lever (not illustrated) is provided in the rear side trim 20 which is the right-side luggage compartment side wall, the operation lever and the locking mechanism 15 of the seat back 13B of the right-side seat 13 are connected together by an operation cable 21, and when the operation lever (not illustrated) is operated, the locking mechanism 15 is unlocked and the seat back 13B is tilted forwards.

The operation lever described above is arranged at a position close to the rear opening section 18, in such a manner the operation lever described above can be operated from the side of the rear opening section 18.

In this embodiment, the two adjacent seat backs are taken to be a seat back 11B of the left-side seat 11 which is positioned on the outer side in the vehicle width direction and a seat back 12B of a central seat 12 which is positioned on the inner side in the vehicle width direction and which has a narrower width in the vehicle width direction than the seat back 11B.

The locking mechanisms 14, 16 of the two adjacent seat backs 11B, 12B are respectively connected to two operation levers 31, 32 via operation cables 22, 23.

More desirably, the operation lever 31 is connected to the locking mechanism 14 via the operation cable 22, and the operation lever 32 is connected to the locking mechanism 16 via the operation cable 23.

As shown in FIG. 1, these two operation levers 31, 32 are formed into an integrated unit by a unit housing 33, and are arranged on the rear side trim 19 which forms the left-side luggage compartment side wall.

The unit housing 33 described above is coupled and fixed to the left-side rear side panel via a bracket, which is not illustrated.

The unit housing 33 described above is arranged at a position close to the rear opening section 18, in such a manner that the two operation levers 31, 32 can be operated from the side of the rear opening section 18.

In other words, the unit housing 33 which forms the two operating levers 31, 32 into an integrated unit is provided on the luggage compartment side wall (rear side trim 19) of the vehicle left side where the seat back 11B of the left-side seat 11 which forms an outer seat back is positioned.

Figure 3:
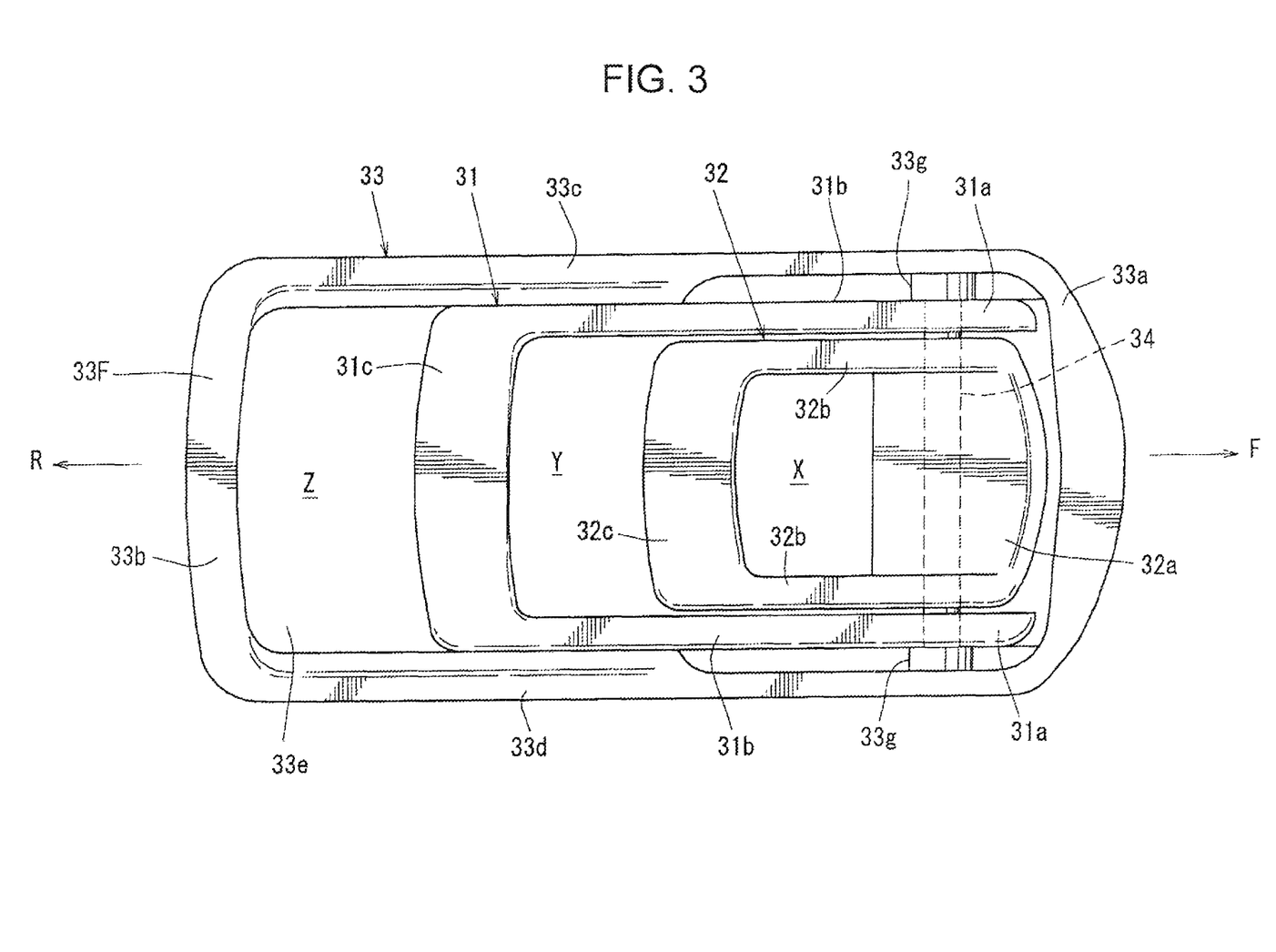
FIG. 3 is a front face diagram of an operation lever unit according to a first embodiment, in which two operation levers are formed into a unit.

Operation Lever Unit According to First Embodiment:

FIG. 3 is a front view diagram showing the unit housing 33 shown in FIG. 1 and the operation lever unit of the first embodiment which is constituted by the levers 31, 32, as viewed from the side of the luggage compartment 17. As shown in FIG. 3, the two operation levers 31, 32 described above are a central lever 32 and an outer lever 31 provided on the outside of the central lever 32, these levers having the same lever support axle 34, which is a pivot support point.

As shown in FIG. 3, the central lever 32 includes a base part 32a which is installed on a lever support axle 34, two arm parts 32b which extend rearwards from the base part 32a, and a knob 32c which is an operation part that is formed integrally on the free end side of the arm part 32b.

The outer lever 31 provided on the outside of the central lever 32 includes upper and lower base parts 31a which are installed on the lever support axle 34, two arm parts 31b which extend rearwards from the respective base parts 31a, and a knob 31c which is an operation part that is formed integrally on the free end sides of the arm parts 31b.

Here, the knob 31c of the outer lever 31 described above is positioned on the rear side of the vehicle, and the knob 32c of the central lever 32 is positioned on the front side of the vehicle.

The unit housing 33 described above includes a flange part 33F in which a front piece 33a, a rear piece 33b, an upper piece 33c, and a lower piece 33d are coupled integrally in a rectangular frame shape, a vertical wall part 33e which is formed integrally with the flange part 33F at a position further towards the vehicle body than the flange part 33F, and a pair of upper and lower boss parts 33g which hold the lever support axle 34.

In the embodiment which is shown in FIG. 3, the central lever 32 is formed in a rectangular frame shape (a quadrilateral frame shape) in a front face view, and the outer lever 31 is formed in a square U shape which is open on the front side of the vehicle in front face view.

An operation space X for operating the lever is formed between the knob 32c and the base part 32a of the central lever 32, an operation space Y for operating the lever is formed between the knob 32c of the central lever 32 and the knob 31c of the outer lever 31, and an operation space Z for operating the lever is formed between the knob 31c of the outer lever 31 and the rear piece 33b of the unit housing 33. By this configuration, when an occupant operates a lever by hooking his or her finger about the knob 31c or 32c, the occupant has increased freedom to hook his or her finger about the knobs 31c, 32c. Further, due to the formation of a plurality of operation spaces X, Y, Z, weight reduction of the outer lever 31 and the central lever 32 can be improved.

Moreover, as shown in FIG. 1 and FIG. 2, the outer lever 31 is connected to the locking mechanism 14 of the seat back 11B of the left-side seat 11 via the operation cable 22, and the central lever 32 is connected to the locking mechanism 16 of the seat back 12B of the central seat 12 via the operation cable 23.

Furthermore, in this embodiment, the locking mechanism 14 is unlocked via the operation cable 22 by an operation of the outer lever 31, in such a manner both the seat backs 11B, 12B are tilted forwards together.

Here, the rear end part 22b of the operation cable 22 described above is disposed so as to correspond to the front side upper position of the outer lever 31 as shown in FIG. 1, and the cable 22 extends forwards and downwards by passing between the rear side body and the rear side trim 19, and is then connected to the latch of the locking mechanism 14 by passing inside the seat back 11B, as shown in FIG. 1 and FIG. 2.

Here, the rear end part 23b of the operation cable 23 described above is disposed so as to correspond to the front side central position of the central lever 32 as shown in FIG. 1, and the cable 23 passes substantially parallel to the operation cable 22, extends forwards and downwards by passing between the rear side body and the rear side trim 19, and is then connected to the latch of the locking mechanism 16 by passing inside the seat back 12B, as shown in FIG. 2.

The operation cables 22, 23 described above are disposed so as not be visible from the side of the luggage compartment 17, due to the presence of the rear side trim 19, the seat backs 11B, 12B and a luggage compartment board (not illustrated) which is provided on the floor of the luggage compartment, thereby achieving a composition which maintains a good external appearance.

On the other hand, a lock release operation member (not illustrated) for forwardly tilting the seat back 11B, 12B, 13B is provided in a prescribed section, for example, a shoulder section, of each of the seat backs 11B, 12B, 13B in the 4:2:4 split structure, the lock release operation member being operated from inside the vehicle cabin rather than from the luggage compartment. In the drawings, the arrow F indicates a forward direction of the vehicle, the arrow R indicates a rearward direction of the vehicle, the arrow IN indicates the interior of the vehicle and the arrow OUT indicates the outside of the vehicle.

There follows a description of the actions of the embodiment depicted in the drawings which has the composition described above.

When tilting only the seat back 12B of the central seat 12 forwards onto the seat back 12C from a normal state as shown in FIG. 2, if the knob 32c of the central lever 32 provided on the luggage compartment side surface is pulled forwards, then the latch of the locking mechanism 16 is unlocked via the operation cable 23 and therefore the seat back 12B is tilted forwards by a spring force which acts in the tilting direction.

In the normal state shown in FIG. 2 (a normal state where the three seat backs 11B, 12B, 13B are all upright), the striker provided in the right side section of the seat back 11B is engaged with the latch provided in the left side section of the seat back 12B.

When tilting the seat back 11B of the left-side seat 11 and the seat back 12B of the central seat 12 forwards onto the seat cushions 11C, 12C from a normal state as shown in FIG. 2, if the knob 31c of the outer lever 31 provided on the luggage compartment side surface is pulled forwards, then the latch of the locking mechanism 14 is unlocked via the operation cable 22 and therefore the seat back 11B is tilted forwards by a spring force which acts in the tilting direction.

In this case, since the latch of the locking mechanism 16 remains in a locked state, then the seat back 11B tilts forwards together with the adjacent seat back 12B and hence the two seat backs 11B, 12B can be tilted forwards simultaneously simply by operating the one outer lever 31.

Instead of this composition, it is also possible to adopt a composition in which forward tilting of the seat back 11B only is possible by the outer lever 31, and forward tilting of the seat back 12B only is possible by the central lever 32.

In this way, the mechanism for operating a vehicle split seat according to the embodiments described in FIG. 1 to FIG. 3 is a mechanism for operating a vehicle split seat whereby a plurality of seat backs 11B, 12B, 13B which are split in a vehicle width direction with respect to a vehicle body can be tilted forwards by operation of a plurality of operation levers 31, 32 which are arranged on a vehicle body side of a luggage compartment 17; wherein two operation levers 31, 32 are respectively connected via operation cables 22, 23 to locking mechanisms 14, 16 of at least two adjacent seat backs 11B, 12B; the operation levers 31, 32 include a central lever 32 and an outer lever 31 provided on the outside of the central lever 32, the central lever and the outer lever having a same pivot support point (see lever support axle 34), and both the levers having an operation part (see knobs 31c, 32c) provided on a free end side of arm parts 31b, 32b of the levers 31, 32; and operation spaces X, Y, Z for individually operating both the levers 31, 32 are formed between both the levers (see FIG. 1, FIG. 2 and FIG. 3).

According to this composition, since the central lever 32 and the outer lever 31 have the same pivot support point (see lever support axle 34), operation parts (see knobs 31c, 32c) are provided on free end sides of arm parts 31b, 32b of the levers 31, 32 and operation spaces X, Y, Z which enable the levers 31, 32 to be operated individually are provided, then it is possible to arrange the operation levers 31, 32 compactly on a wall surface of the luggage compartment 17 or the like such that the operation levers 31, 32 of the two seat backs 11B, 12B have the same pivot support point, without impairing operability of the levers, due to the formation of the operation parts (see knobs 31c, 32c) and the operation spaces X, Y, Z.

Furthermore, the two adjacent seat backs 11B, 12B include an outer seat back 11B positioned on an outer side in the vehicle width direction; and an inner seat back 12B positioned on an inner side in the vehicle width direction and having a width narrower than the outer seat back 11B; the outer lever 31 is connected to the outer seat back 11B; and the central lever 32 is connected to the inner seat back 12B (see FIG. 1 to FIG. 3).

According to this composition, it is possible to set the sizes of the levers so as to correspond to the sizes of the seat backs 11B, 12B of the outer seat back 11B and the inner seat back 12B, and hence an occupant is readily able to distinguish between the levers 31, 32 for the seat backs 11B, 12B to be tiled forwards, and hence the ease of operation can be improved.

Moreover, the outer seat back 11B described above is locked in an upright state with respect to the vehicle body, the inner seat back 12B is locked in an upright state with respect to the outer seat back 11B, and both the seat backs 11B, 12B can be tilted forwards by the operation of the outer lever 31 (see FIG. 2 and FIG. 3).

According to this composition, it is possible to tilt the two seat backs 11B, 12B forwards simply by operation of the outer lever 31, while maintaining the independent tilting capability of the inner seat back 12B, and therefore usability can be improved.

Moreover, the two adjacent seat backs 11B, 12B are an outer seat back 11B which is positioned on an outer side in the vehicle width direction and an inner seat back 12B which is positioned on an inner side in the vehicle width direction; the two operation levers 31, 32 are provided on a luggage compartment side wall of the vehicle where the outer seat back 11B is positioned; and the operation part (see knob 31c) of the outer lever 31 is positioned on a vehicle rear side, and the operation part (see knob 32c) of the central lever 32 is positioned on a vehicle front side (see FIG. 1 to FIG. 3).

According to this composition, it is possible to arrange two operation levers 31, 32 in conformity to a positional relationship viewed from the plane of the seat backs (the outer seat back 11B and the inner seat back 12B) that are to be tilted forwards by the operation levers 31, 32, the levers 31, 32 for the seat backs 11B, 12B to be tilted forwards can be differentiated directly and instinctively, and hence the selection of the lever is made more straightforward.

In addition, the central lever 32 and the outer lever 31 both have a pair of arm parts 32b, 31b, and an operation part (see knobs 32c, 31c) coupled to free end sides of the arm parts; and operation spaces Y, X are provided at least between the operation parts of the respective levers 31, 32 (between the knobs 31c, 32c), and on the base end side of the operation part (knob 32c) of the central lever 32, respectively.

According to this composition, since a plurality of operation spaces Y, X are formed at least between the operation parts (knobs 31c, 32c) of the levers 31, 32, and on the base end side of the operation part (see knob 32c) of the central lever 32, respectively, then it is possible to increase the freedom with which an occupant can hook his or her finger about the operation parts (knobs 31c, 32c), and due to the formation of the plurality of operation spaces (X, Y), it is possible to improve weight reduction of the operation levers 31, 32.

Figure 4:
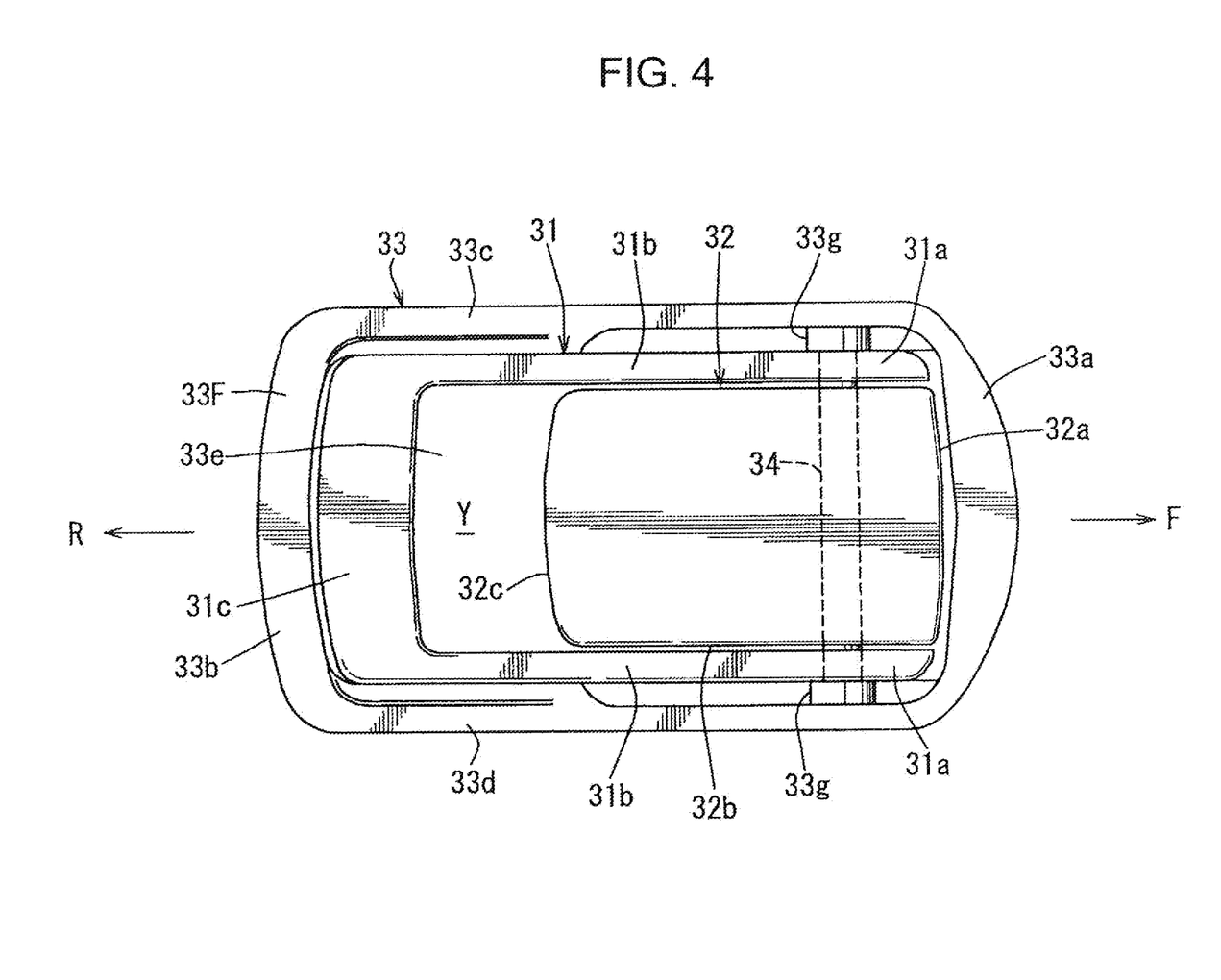
FIG. 4 is a front face diagram showing a second embodiment of an operation lever unit.

Operation Lever Unit According to Second Embodiment:

FIG. 4 shows a second embodiment of the operation lever unit described above.

In other words, the operation lever unit shown in FIG. 4 seeks to simplify the processing of the central lever 32 by forming the central lever 32 in a plate shape which omits the operation space X, while also seeking to reduce the weight of the unit housing 33 by forming the unit housing 33 to have a shorter length in the forward/rear direction of the vehicle compared to the first embodiment shown in FIG. 3, so as to omit the operation space Z.

In the embodiment shown in FIG. 4, only one operation space Y is formed, and an occupant selects a lever by hooking his or her finger about the knob 32c of the central lever 32, from the rear, by using the operation space Y or by hooking his or her finger about the knob 31c of the outer lever 31, from the front.

In the embodiment shown in FIG. 4, the remainder of the composition, actions and beneficial effects are virtually the same as those of the first embodiment which was described above with reference to FIG. 1 to FIG. 3, and therefore portions which are the same as the previous drawings are labeled with the same reference numerals in FIG. 4, and detailed description thereof is omitted here.

Figure 5:
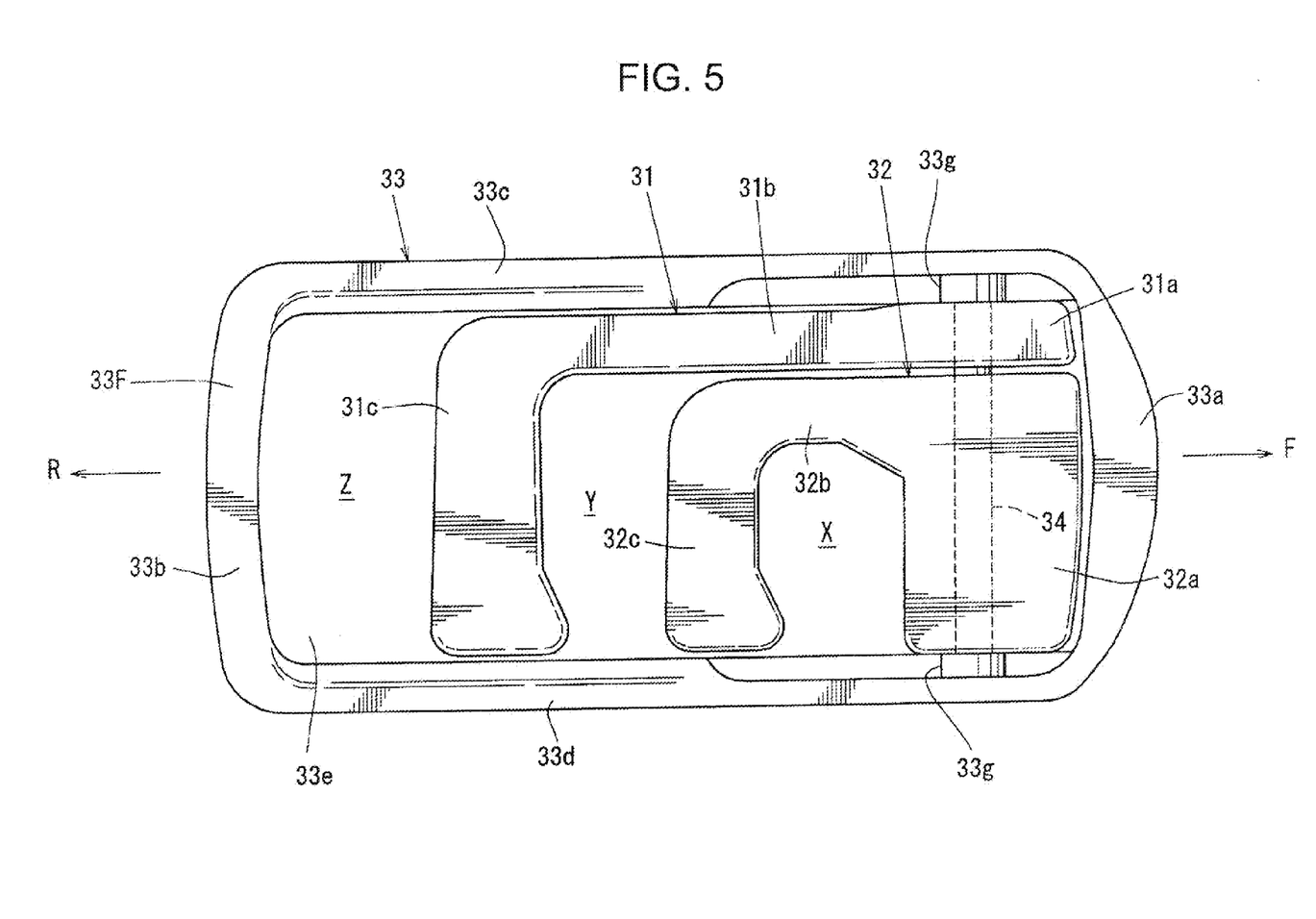
FIG. 5 is a front face diagram showing a third embodiment of an operation lever unit.

Operation Lever Unit According to Third Embodiment:

FIG. 5 shows a third embodiment of the operation lever unit.

In other words, in the first embodiment shown in FIG. 3, a rectangular frame-shaped central lever 32 and a square U-shaped outer lever 31 were adopted, but the third embodiment shown in FIG. 5 adopts a central lever 32 in which an arm part 32b and knob 32c are connected integrally in an L shape, and an outer lever 31 in which a base part 31a, an arm part 31b and a knob 31c are connected integrally in an L shape.

In the third embodiment also, an operation space X is formed between the base part 32a and the knob 32c of the central lever 32, an operation space Y is formed between the knobs 31c, 32c of the levers 31, 32, and an operation space Z is also formed between the knob 31c of the outer lever 31 and the rear piece 33b of the unit housing 33, whereby an operation lever unit having a total of three operation spaces X, Y, Z is formed similarly to the first embodiment shown in FIG. 3.

In the third embodiment, the remainder of the composition, actions and beneficial effects are virtually the same as those of the first embodiment which was described above with reference to FIG. 1 to FIG. 3, and therefore portions which are the same as the previous drawings are labeled with the same reference numerals in FIG. 5, and detailed description thereof is omitted here.

Figure 6:
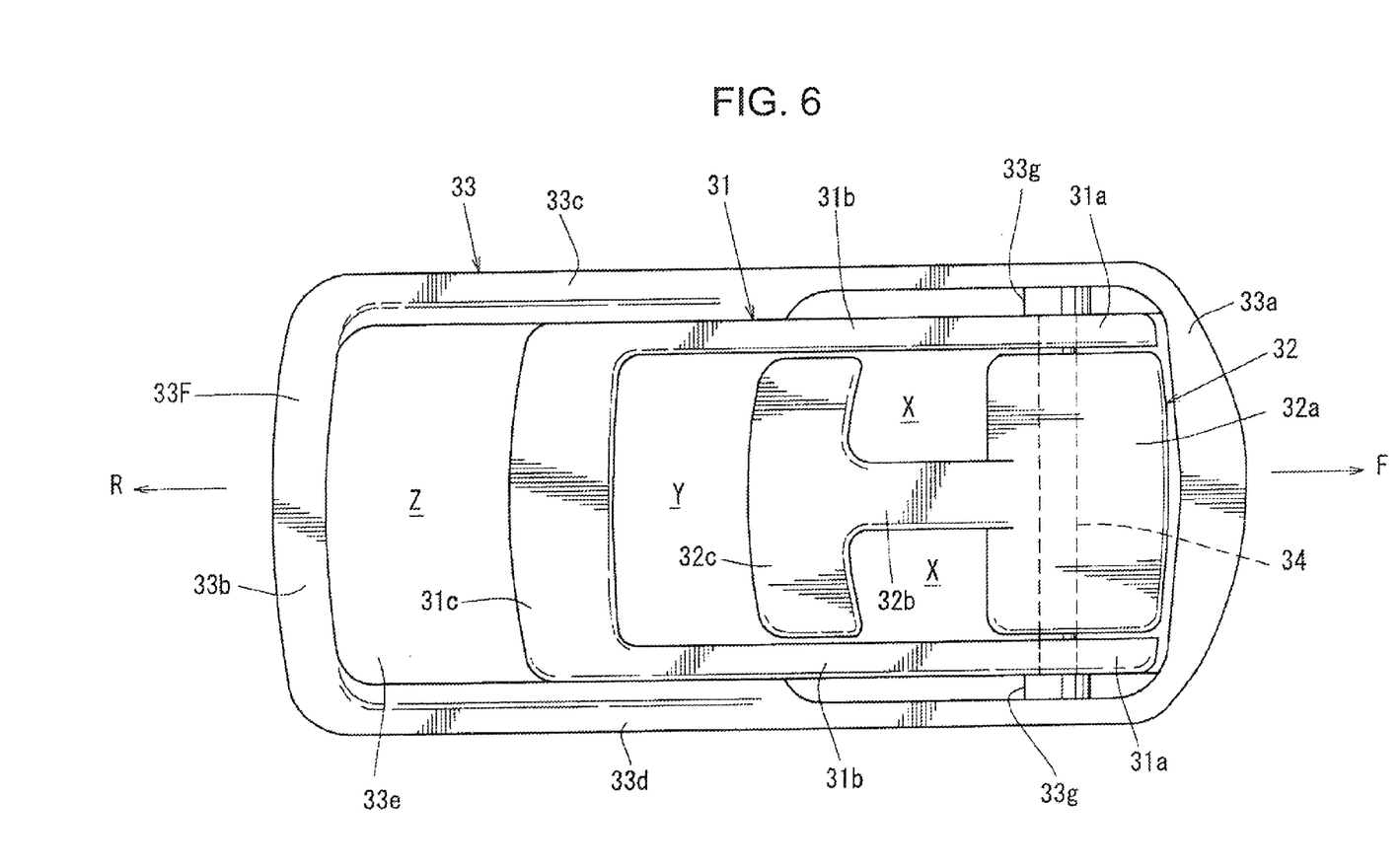
FIG. 6 is a front face diagram showing a fourth embodiment of an operation lever unit.

Operation lever unit according to fourth embodiment:

FIG. 6 shows a fourth embodiment of the operation lever unit.

In the fourth embodiment, a central lever 32 of the following kind is adopted instead of the central lever 32 having a rectangular frame shape as shown in FIG. 3.

In other words, the central lever 32 in FIG. 6 includes a base part 32a which is installed on a lever support axle 34 forming a pivot support point, an arm part 32b which extends rearwards from a center of the rear portion of the base part 32a, and a knob 32c which is connected integrally with a free end side of the arm part 32b so as to be perpendicular to the arm part 32b, the arm part 32b and the knob 32c being coupled in a laterally-oriented T shape.

In the fourth embodiment shown in FIG. 6 also, operation spaces X in upper and lower positions partitioned by the arm part 32b are formed between the base part 32a and the knob 32c of the central lever 32, an operation space Y is formed between the knobs 31c, 32c of the levers 31, 32, and an operation space Z is also formed between the knob 31c of the outer lever 31 and the rear piece 33b of the unit housing 33, whereby an operation lever unit having a plurality of operation spaces X, Y, Z is formed similarly to the embodiments shown in FIG. 3 and FIG. 5.

In the fourth embodiment shown in FIG. 6, the remainder of the composition, actions and beneficial effects are virtually the same as those of the first embodiment which was described above with reference to FIG. 1 to FIG. 3, and therefore portions which are the same as the previous drawings are labeled with the same reference numerals in FIG. 6, and detailed description thereof is omitted here.

To state the correspondences between the composition of the present invention and the embodiments described above, the two adjacent seat backs of the invention correspond to the seat back 11B of the left-side seat 11 and the seat back 12B of the central seat 12 in the embodiments, and similarly, the outer seat back corresponds to the seat back 11B, the inner seat back corresponds to the seat back 12B, the pivot support point corresponds to the lever support axle 34, and the operation parts of the operation levers correspond to the knob 31c of the outer lever 31 and the knob 32c of the central lever 32, although the invention is not limited to the compositions of the embodiments described above.

For example, it is of course also possible to apply the present invention to a structure in which the two adjacent seat backs are set to be the seat back 13B of the right-side seat 13 and the seat back 12B of the central seat 12, and the operation lever unit is arranged on the right-side wall of the luggage compartment.

Summary of Embodiments

The mechanism for operating a vehicle split seat according to the present invention is a mechanism for operating a vehicle split seat whereby a plurality of seat backs split in a vehicle width direction with respect to a vehicle body can be tilted forwards by operation of a plurality of operation levers which are arranged on a vehicle body side of a luggage compartment located on the vehicle rear side of the seat backs; wherein two operation levers are respectively connected via operation cables to locking mechanisms of at least two adjacent seat backs; the operation levers are formed of a central lever and an outer lever provided on the outside of the central lever, the central lever and the outer lever having a same pivot support point; both the levers each have an arm part which can swing about the pivot support point and an operation part provided on a free end side of the arm part; and an operation space for individually operating both the levers is formed between both the levers.

There may be one or more of the operation spaces described above.

According to the composition described above, since the central lever and the outer lever have the same pivot support point, operation parts are provided on the free end sides of the arm parts of the levers and an operation space which enables individual operation of both the levers is provided, then the operation levers of the two seat backs can be arranged compactly on a wall surface of the luggage compartment or the like such that the two operation levers have the same pivot support point, without impairing operability of the levers, due to the formation of the operation parts and the operation space.

In one mode of the invention, the two adjacent seat backs are formed of an outer seat back positioned on an outer side in the vehicle width direction, and an inner seat back positioned on an inner side in the vehicle width direction and having a width narrower than the outer seat back; the outer lever is connected to the outer seat back; and the central lever is connected to the inner seat back.

According to the composition described above, it is possible to set the sizes of the levers so as to correspond to the sizes of the outer seat back and the inner seat back, and hence an occupant is readily able to distinguish between the levers of the seat backs to be tiled forwards, and hence the ease of operation can be improved.

In one mode of this invention, the outer seat back is locked in an upright state with respect to the vehicle body; the inner seat back is locked in an upright state with respect to the outer seat back; and both the seat backs are tilted forwards by releasing the locking of the outer seat back with respect to the vehicle body by the operation of the outer lever.

According to the composition described above, it is possible to forwardly tilt the two seat backs simply by operation of the outer lever, while maintaining the independently tilting capability of the inner seat back, and therefore usability can be improved.

In one mode of the present invention, the two adjacent seat backs are formed of an outer seat back which is positioned on an outer side in the vehicle width direction, and an inner seat back which is positioned on an inner side in the vehicle width direction; the two operation levers are formed of the outer lever which is connected to the outer seat back, and an inner lever which is connected to the inner seat back, and the two operation levers are provided on a luggage compartment side wall of the vehicle where the outer seat back is positioned; the operation part of the outer lever is positioned on a vehicle rear side; and the operation part of the central lever is positioned on a vehicle front side.

According to the composition described above, it is possible to arrange two operation levers in conformity to a positional relationship viewed from the plane of the seat backs (the outer seat back and the inner seat back) that are to be tilted forwards by the operation levers, the levers of the seat backs to be tilted forwards can be differentiated directly and instinctively, and hence the selection of the lever is made more straightforward.

In one mode of the invention, the central lever and the outer lever both have the arm part and the operation part provided on a free end side of the arm part; and an operation space (Y) is provided at least between the operation parts of the respective levers (first, second, third and fourth embodiments).

In one mode of the invention, the central lever and the outer lever both have the arm part and the operation part coupled to a free end side of the arm part; and an operation space (Z) is provided on a vehicle rear end side of the operation part of the outer lever (first, third and fourth embodiments).

In one mode of the invention, an operation space (X) is formed on a base end side of the operation part of the central lever (first, third and fourth embodiments).

In one mode of the invention, the central lever and the outer lever both have a pair of the arm parts and the operation part coupled to free end sides of the arm parts; and operation spaces (X) are provided at least in a gap (Y) between the operation parts of the respective levers, and on a base end side of the operation part of the central lever. According to this composition, since a plurality of operation spaces are formed, at least between the operation parts of the levers and on the base end side of the operation part of the central lever, then it is possible to increase the freedom with which an occupant can hook his or her finger about the operation parts, and due to the formation of the plurality of operation spaces, it is possible to improve weight reduction of the operation levers.

The present application is based on Japanese Patent Application No. 2010-264495 filed in the Japan Patent Office on Nov. 29, 2010, and the entire contents of Japanese Patent Application No. 2010-264495 are incorporated into the present application.

The invention of the present application has been described appropriately and adequately by means of the embodiments, with reference to the foregoing description and the accompanying drawings, but a person skilled in the art could readily make various modifications or improvements on the basis of the embodiments described above. Consequently, if modifications or improvements of this kind are made, these modifications or improvements are understood to be included in the scope of the rights of the present invention, provided that they do not depart from the scope of the invention as defined by the claims stated below.

The invention claimed is:

1. A mechanism for operating a vehicle split seat whereby a plurality of seat backs split in a vehicle width direction with respect to a vehicle body can be tilted forwards by operation of a plurality of operation levers which are arranged on a vehicle body side of a luggage compartment located on a vehicle rear side of the seat backs, wherein two operation levers are respectively connected via operation cables to locking mechanisms of at least two adjacent seat backs, the operation levers are formed of a central lever and an outer lever provided on an outside of the central lever, the central lever and the outer lever having a same pivot support point, both the levers each have an arm part which can swing about the pivot support point and an operation part provided on a free end side of the arm part, the operation part of the central lever and the operation part of the outer lever are arranged side by side along a forward/rear direction of the vehicle, and an operation space for individually operating both the levers is formed at least between the operation parts of the respective levers.

2. The mechanism for operating a vehicle split seat according to claim 1, wherein the two adjacent seat backs are formed of an outer seat back positioned on an outer side in the vehicle width direction, and an inner seat back positioned on an inner side in the vehicle width direction and having a width narrower than the outer seat back, the outer lever is connected to the outer seat back, and the central lever is connected to the inner seat back.

3. The mechanism for operating a vehicle split seat according to claim 2, wherein the outer seat back is locked in an upright state with respect to the vehicle body, the inner seat back is locked in an upright state with respect to the outer seat back, and both the seat backs can be tilted forwards by releasing a locking of the outer seat back with respect to the vehicle body by the operation of the outer lever.

4. The mechanism for operating a vehicle split seat according to claim 3, wherein the central lever and the outer lever both have the arm part and the operation part coupled to a free end side of the arm part, and an operation space is provided on a vehicle rear end side of the operation part of the outer lever.

5. The mechanism for operating a vehicle split seat according to claim 4, wherein an operation space is formed on a base end side of the operation part of the central lever.

6. The mechanism for operating a vehicle split seat according to claim 3, wherein the central lever and the outer lever both have a pair of the arm parts and the operation part coupled to free end sides of the arm parts, and operation spaces are provided at least between the operation parts of the respective levers, and on a base end side of the operation part of the central lever.

7. The mechanism for operating a vehicle split seat according to claim 2, wherein the central lever and the outer lever both have the arm part and the operation part coupled to a free end side of the arm part, and an operation space is provided on a vehicle rear end side of the operation part of the outer lever.

8. The mechanism for operating a vehicle split seat according to claim 7, wherein an operation space is formed on a base end side of the operation part of the central lever.

9. The mechanism for operating a vehicle split seat according to claim 2, wherein the central lever and the outer lever both have a pair of the arm parts and the operation part coupled to free end sides of the arm parts, and operation spaces are provided at least between the operation parts of the respective levers, and on a base end side of the operation part of the central lever.

10. The mechanism for operating a vehicle split seat according to claim 1,
wherein the two adjacent seat backs are formed of an outer seat back which is positioned on an outer side in the vehicle width direction, and an inner seat back which is positioned on an inner side in the vehicle width direction,
the two operation levers are formed of the outer lever which is connected to the outer seat back, and the central lever which is connected to the inner seat back, and the two operation levers are provided on a luggage compartment side wall of the vehicle where the outer seat back is positioned, and
the operation part of the outer lever is positioned on a vehicle rear side, and the operation part of the central lever is positioned on a vehicle front side.

11. The mechanism for operating a vehicle split seat according to claim 10,
wherein the central lever and the outer lever both have the arm part and the operation part coupled to a free end side of the arm part, and
an operation space is provided on a vehicle rear end side of the operation part of the outer lever.

12. The mechanism for operating a vehicle split seat according to claim 11,
wherein an operation space is formed on a base end side of the operation part of the central lever.

13. The mechanism for operating a vehicle split seat according to claim 10,
wherein the central lever and the outer lever both have a pair of the arm parts and the operation part coupled to free end sides of the arm parts, and
operation spaces are provided at least between the operation parts of the respective levers, and on a base end side of the operation part of the central lever.

14. The mechanism for operating a vehicle split seat according to claim 1,
wherein the central lever and the outer lever both have the arm part and the operation part coupled to a free end side of the arm part, and
an operation space is provided on a vehicle rear end side of the operation part of the outer lever.

15. The mechanism for operating a vehicle split seat according to claim 14,
wherein an operation space is formed on a base end side of the operation part of the central lever.

16. The mechanism for operating a vehicle split seat according to claim 1,
wherein the central lever and the outer lever both have a pair of the arm parts and the operation part coupled to free end sides of the arm parts, and
operation spaces are provided at least between the operation parts of the respective levers, and on a base end side of the operation part of the central lever.

* * * * *